United States Patent
Bhatia et al.

(10) Patent No.: US 9,633,055 B2
(45) Date of Patent: Apr. 25, 2017

(54) DATABASE MIGRATION

(71) Applicant: Microsoft Technology Licensing, LLC, Redmond, WA (US)

(72) Inventors: Tarun Bhatia, Snohomish, WA (US); Vladimir Gerasimov, Sammamish, WA (US); Balinder Malhi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 14/278,023

(22) Filed: May 15, 2014

(65) Prior Publication Data

US 2015/0331857 A1    Nov. 19, 2015

(51) Int. Cl.
G06F 17/30 (2006.01)
G06F 17/00 (2006.01)

(52) U.S. Cl.
CPC .................. *G06F 17/303* (2013.01)

(58) Field of Classification Search
CPC ............. G06F 17/303; G06F 17/30008; G06F 17/30079; G06F 17/30306; G06F 17/30557; G06F 17/30575; G06F 17/30595; G06F 8/51; G06F 11/14; G06F 17/30312; G06F 17/30371; G06F 17/30377; G06F 17/30463; G06F 17/3051; G06F 17/30914; G06F 17/30958
IPC .............................................. G06F 17/30,17/00
See application file for complete search history.

(56) References Cited

U.S. PATENT DOCUMENTS

| | | | |
|---|---|---|---|
| 7,769,720 B2 | 8/2010 | Armington | |
| 7,831,792 B2 | 11/2010 | Maruyama et al. | |
| 8,065,276 B2 | 11/2011 | Pudipeddi et al. | |
| 8,150,811 B1 | 4/2012 | Tarenskeen et al. | |
| 2010/0114967 A1 | 5/2010 | Yaniv et al. | |
| 2013/0007387 A1 | 1/2013 | Sakaguchi et al. | |
| 2015/0019488 A1* | 1/2015 | Higginson | G06F 17/303 707/634 |

OTHER PUBLICATIONS

"Cisco MDS Data Mobility Manager: Streamlined Data Migration", Retrieved on: Mar. 21, 2014, Available at: http://www.cisco.com/c/en/us/products/collateral/storage-networking/mds-9000-intelligent-fabric-applications/product_data_sheet0900aecd80692d6d.html.

Casas, et al., "MIST: PVM with Transparent Migration and Checkpointing", In Proceedings of 3rd Annual PVM Users' Group Meeting, May, 1995, 13 pages.

* cited by examiner

*Primary Examiner* — Yicun Wu
(74) *Attorney, Agent, or Firm* — Christopher J. Volkmann; Kelly, Holt & Christenson, PLLC

(57) ABSTRACT

A migration framework includes a migration status data store that stores the migration status of a variety of different databases that are being migrated. A migration manager monitors the migration status of the different databases and invokes migration scripts to perform migration steps on the various databases, based upon their migration status. As the migration steps are completed, a status update component updates the migration status of the various databases that are being migrated.

20 Claims, 12 Drawing Sheets

DATABASE MIGRATION

BACKGROUND

Computer systems are currently in wide use. Some types of computer systems can be deployed in an on-premise deployment or in a cloud-based deployment.

As an example, enterprise deployments are computer systems that can be used to manage the business of an enterprise organization. Some such computer systems include customer relations management (CRM) systems, enterprise resource planning (ERP) systems, line-of-business (LOB) systems, document management systems, electronic mail and other messaging systems, among a wide variety of others. These types of systems can often be run in an on-premise deployment, or in a cloud-based deployment. Similarly, some organizations may wish to migrate these systems from one deployment to another. For instance, an organization may wish to migrate the system from an on-premise system to a cloud-based system, or vice versa.

Currently, in order to perform such migrations, organizations often use third-party tools to migrate the large amount of databases from one deployment infrastructure to the other. This process, itself, can be quite complicated and difficult to manage. The migration operations are currently performed in a synchronous fashion and sequentially (as opposed to in parallel). This can result in a significant performance impact on the organization's infrastructure, during the migration process.

Many larger migrations can span several months. The migration can be deployed in such a way that the organization moves several sites at a time, verifies them on the new infrastructure, and continues this process until all sites are migrated. Each migration introduces a customer outage (where the sites that are being migrated are put into a read only mode).

The discussion above is merely provided for general background information and is not intended to be used as an aid in determining the scope of the claimed subject matter.

SUMMARY

A migration framework includes a migration status data store that stores the migration status of a variety of different databases that are being migrated. A migration manager monitors the migration status of the different databases and invokes migration scripts to perform migration steps on the various databases, based upon their migration status. As the migration steps are completed, a status update component updates the migration status of the various databases that are being migrated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
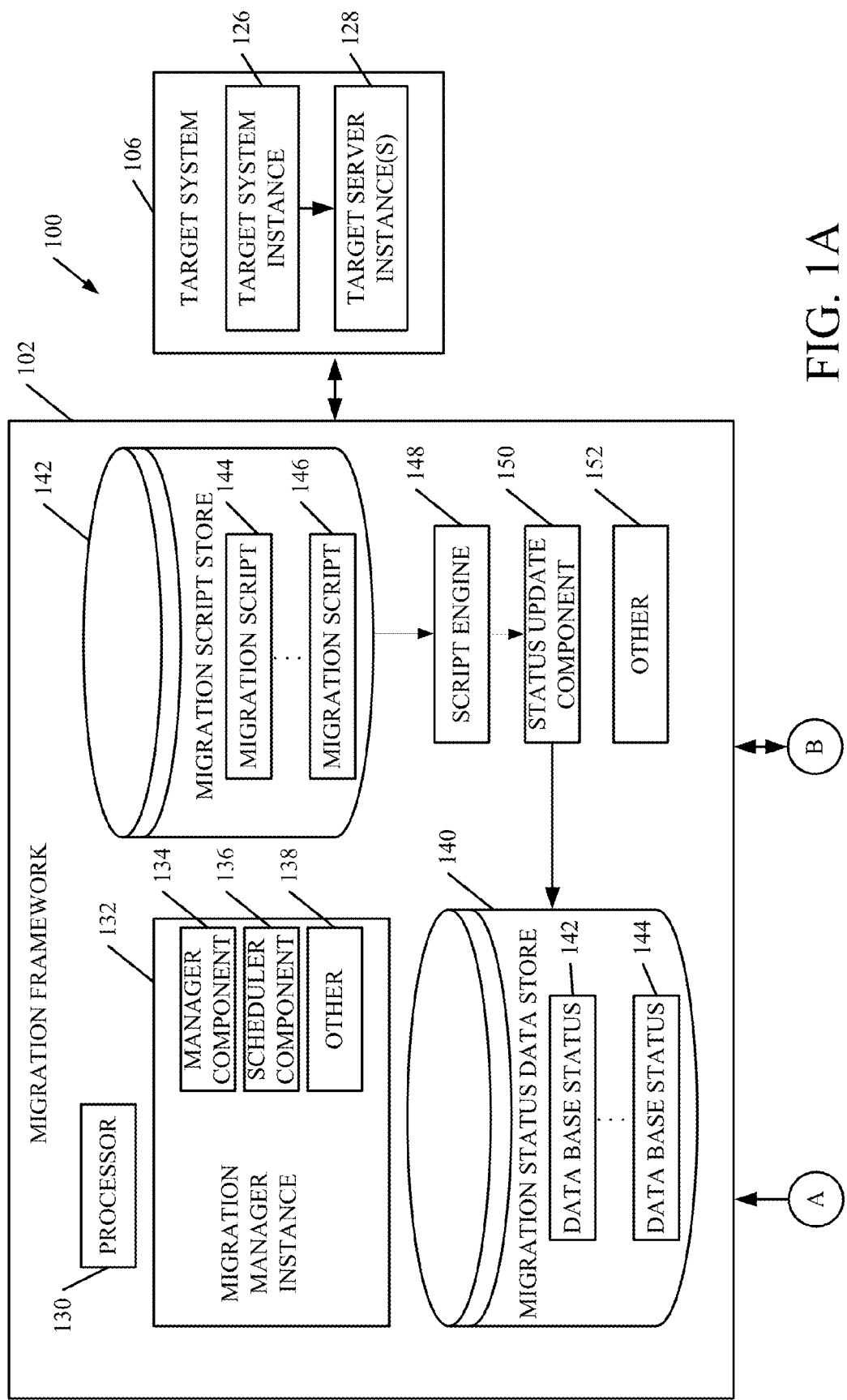
FIGS. 1A and 1B (collectively FIG. 1) show a block diagram of one illustrative database migration framework.
Figure 1B:
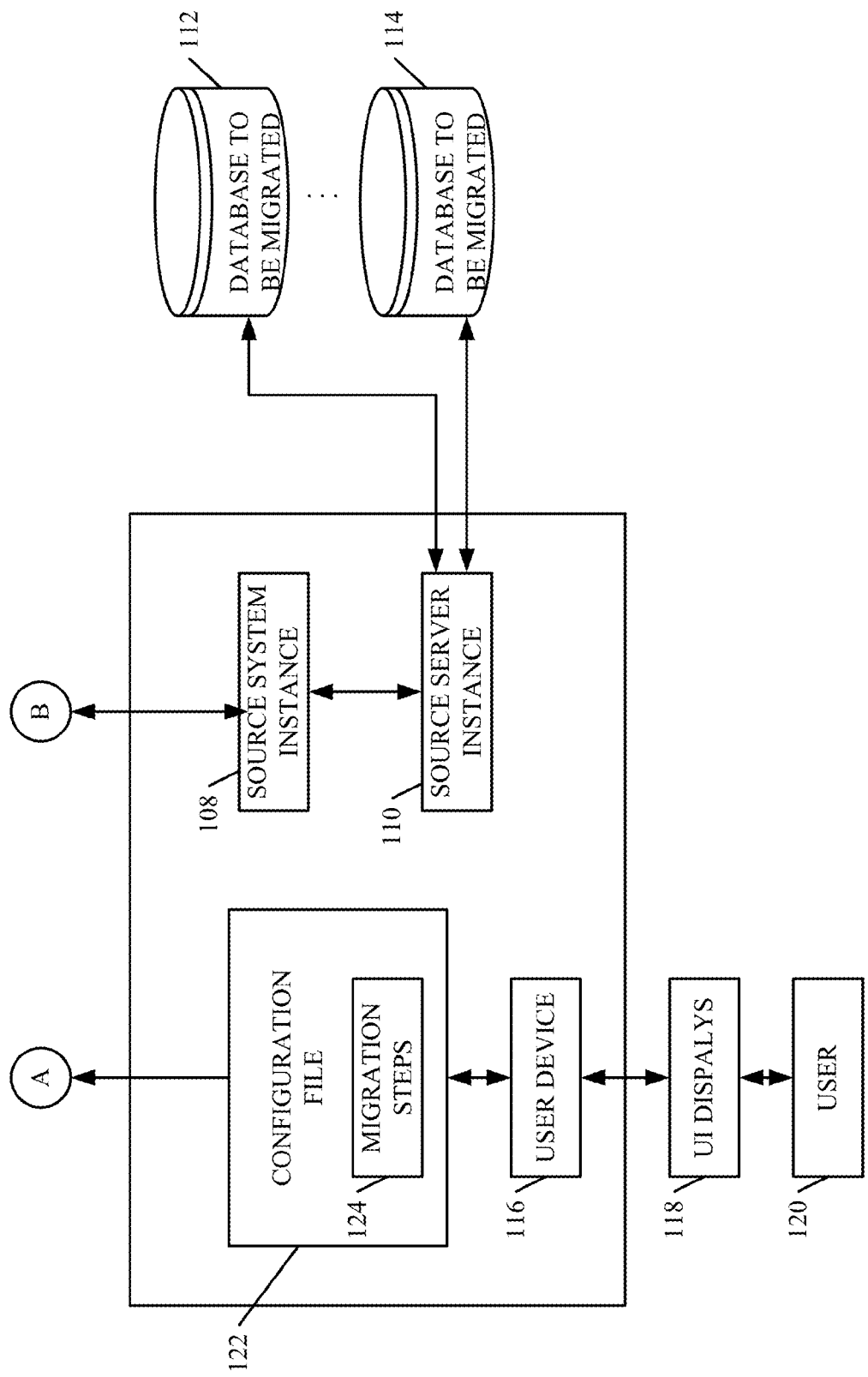

FIGS. 1A and 1B (collectively FIG. 1) show a block diagram of one example of a framework architecture 100. Architecture 100 illustratively includes migration framework 102 that can be used to migrate databases and other items from a source system 104 to a target system 106. Source system 104 illustratively has a source system instance (such as an instance of an enterprise or other system) 108 that uses a source server instance 110. Source system 104 illustratively uses databases 112 and 114 that are to be migrated to target system 106.

Source system 104, in the embodiment shown in FIG. 1, also illustratively includes a user device 116 that generates user interface displays 118 for interaction by user 120. User 120 illustratively interacts with user input mechanism on user interface displays 118 in order to control and manipulate migration framework 102. For instance, user 120 can illustratively generate a configuration file 122 that specifies migration steps 124 that the user wishes to have performed on databases 112 and 114 in order to migrate them from source system 104 to target system 106.

Target system 106 illustratively includes a target system instance 126 and target server instance 128. The databases 112 and 114 are illustratively migrated to target system 106 so that they can be accessed by target system instance 126 through target server instances 128.

Migration framework 102 illustratively includes processor 130, migration manager instance 132 migration status data store 140, navigation script store 142 script engine 148, status update component 150, and it can include other items 152 as well. Migration manager 132, itself, includes manager component 134, scheduler component 136 and it can include other components 138 as well. Migration status data store 140 includes database status indicators 142 and 144 for various databases that are being migrated from source system 104 to target system 106. Navigation script store 142 includes a set of navigation scripts 144-146.

Before describing the operation of architecture 100 in detail, a brief overview will be provided. User 120 first illustratively sets up a target identity for the system that will be deployed to target system 106. User 120 also specifies the migration steps 124 that are to be taken by migration framework 102 to perform the migration. Migration manager 132 opens a database record in migration status data store 140 for each database that is to be migrated from system 104 to system 106. Migration manager instance 132 then begins the migration by performing steps 124. In doing so, migration manager instance 132 triggers migration scripts 144-146 in script store 142. The scripts are run by script engine 148 to perform the migration steps. Status update component 150 provides status information for each of the database records in data store 140 indicating which migration steps have been performed, and whether they have been performed successfully. Migration manager instance 132 monitors the status of each of the databases identified in data store 140 to determine when they are to be moved to a next stage, or whether a current or previous stage is to be re-run because it resulted in errors. This process continues until migration framework 102 has completed the migration.

Figure 2:
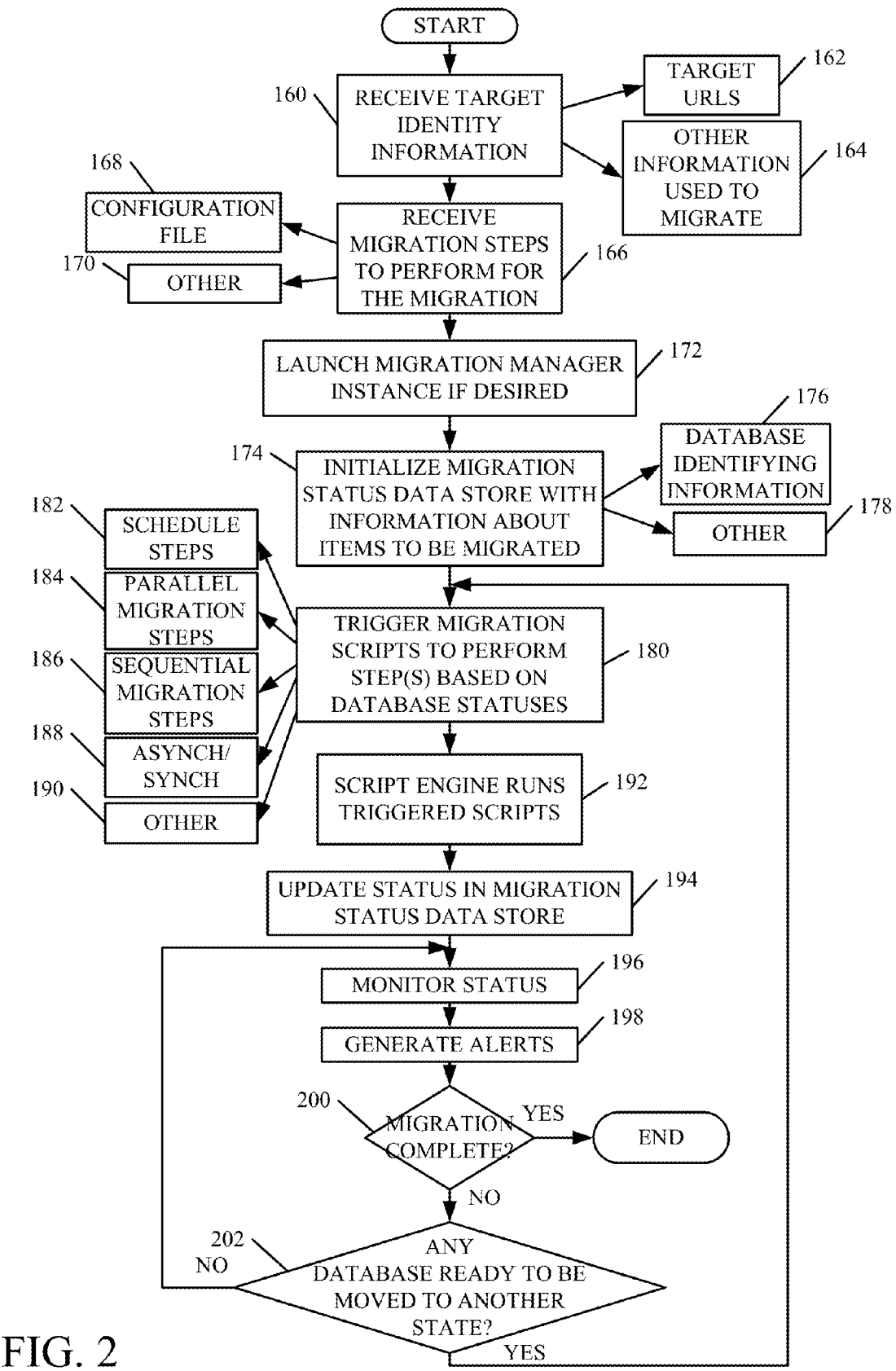
FIG. 2 is a flow diagram illustrating one example of the operation of the architecture shown in FIG. 1 in migrating databases from a source system to a target system.

FIG. 2 is a flow diagram illustrating one embodiment of the operation of architecture 100 in more detail. In one embodiment, migration framework 102 first receives target identity information from system 104 (such as from user 120) identifying the target system 106. This is indicated by block 160 in FIG. 2. For instance, the target identity information can include target uniform resource locators (URLs) 162, or other information that is used by migration framework 102 in order to perform the migration. This is indicated by block 164.

Migration framework 102 then receives the migration steps 124 from user 120. This is indicated by block 166. In one example, user 120 provides inputs to generate a configuration file 122 that identifies the migration steps 124. This is indicated by block 168 in FIG. 2. The migration steps can be identified in other ways as well, and this is indicated by block 170.

It will be appreciated that the particular migration steps that are to be taken can vary based on a wide number of different things. However, one illustrative set of migration steps will be described for the sake of example only. For instance, a first step may be to prepare various configuration files and to verify connectivity between the source and target system 104 and 106. A next step may be to copy a full backup version of databases 112-114 into a storage location that is accessible by target system 106. Another step may be to then restore the backup versions in the target server instance 128. The next step may be to attach the databases, such as through the target server instances 128, to the target system instance 126 (which may be an instance of a document management system, an electronic mail system, a business system, or another enterprise or other system). A next step may be to perform a site transformation in which all old URLs are updated to the new ones. This type of transformation can include mapping old credentials in the source system to new credentials in the target system, among a wide variety of other transformations. A final migration step may be to validate the target system 106 to ensure that the migration has been completed successfully.

Once the migration steps have been received, or at another point in the processing, migration framework 102 can determine whether an additional migration instance 132 is to be launched. For instance, it may be that a given migration manager instance 132 can manage migration of a plurality of different source systems to a plurality of different target systems, at any given time. However, if the workload for that migration manager instance reaches a threshold level, migration framework 102 may launch another migration manager instance and divide the workload between the two of them. In one embodiment, the system is scalable so that multiple different migration manager instances 132, and corresponding other components of migration framework 102, can be launched to accommodate varying workload levels. This is described in greater detail below with respect to FIG. 4. Launching migration manager instances, as desired, is indicated by block 172 in the flow diagram of FIG. 2.

Migration manager instance 132 illustratively includes the migration manager component 134 and scheduler component 136. Manager component 134 illustratively initializes the migration status data store 140 with information about the items to be migrated. This is indicated by block 174 in FIG. 2. For instance, manager component 134 can initialize data store 140 by identifying the various databases that are to be migrated from system 104 to system 106. This is indicated by block 176. Manager component 134 can initialize migration status data store 140 in other ways as well, and this is indicated by block 178.

Scheduler component 136 then schedules the various migration steps 124 that are to be performed on databases 112-114. When a given migration step is to be performed, then scheduler component 136 triggers the migration scripts 144-146 that are used to perform a given migration step. This is indicated by block 180 in FIG. 2. For instance, the steps can be scheduled by scheduler component 136 in a variety of different ways. This is indicated by block 182. They can be scheduled in parallel with one another, as appropriate. This is indicated by block 184. They can be scheduled sequentially, as indicated by block 186, and they can be scheduled either asynchronously or synchronously, as indicated by block 188. The migration steps can be scheduled and the migration scripts can be triggered in other ways as well, and this is indicated by block 190 in FIG. 2.

When a given migration script 144-146 has been triggered by scheduler component 136, script engine 148 runs the migration script in order to perform the corresponding migration step. This is indicated by block 192 in FIG. 2. When script engine 148 has completed running a migration script, status update component 150 provides a status indicator, indicating the status of that script, to the corresponding database status identifier 142-144 in migration status data store 140. Updating the status information is indicated by block 194 in FIG. 2. As an example, databases 112 and 114 may have multiple different steps being performed in parallel. Each database 112-114 has a corresponding database status indicator 142-144 in data store 140. As the migration steps on the different databases are completed, the status information is updated to indicate that.

Migration manager instance 132 monitors the status of the various databases by monitoring the status identifiers 142-144 in data store 140. Monitoring the status is indicated by block 196 in FIG. 2. In performing its monitoring, migration manager instance 132 can repeatedly obtain a list of all databases in migration status data store 140 that have a status that indicates that a current migration step has been finished. It can then move that database to a new state and trigger the migration scripts corresponding to the new state. It can also illustratively attain a list of databases that have a status indicating that the migration step is in progress. It can then check to determine whether a sufficient time has elapsed to indicate that the migration step has timed out. If so, it can retry running the migration script.

During status monitoring, the status may indicate a wide variety of different things. For instance, as discussed above with respect to FIG. 3, it can identify the particular state that the database is currently in, the progress of that state (such as the progress of the particular migration script that is being run on that database by script engine 148), and the status of that state (such as whether the script has been run successfully or run with errors, etc.).

If a script has been run, but it encounters errors, a variety of different alerts may be generated to identify that a migration script is encountering errors while it is run. This is indicated by block 198 in FIG. 2.

At some point, all of the migration steps will have been completed. In that case, manager component 134 determines that the migration has been completed, that it has been validated, and thus, the process ends. This is indicated by block 200 in FIG. 2.

However, if the migration process has not been completed, then manager component 134 determines (based on its monitoring) whether any database is ready to be moved to another state. This is indicated by block 202. For instance, if a migration step has been completed on a given database so that the database is ready to be advanced to the next state, the status information for that database will indicate this. When migration manager 134 identifies that the given database is to be moved to another state, processing reverts to block 180 where migration manager instance 132 triggers the migration scripts that are to be performed in order to perform the next migration step corresponding to the new state of the given database. Again, the scripts can be scheduled, they can be performed sequentially or in parallel, they can be performed synchronously or asynchronously, etc.

This processing continues, with migration manager instance 132 monitoring the status of each database in the source system, shepherding them through the migration process by triggering the various migration scripts, until the migration process is complete. At that point, the processing ends.

Figure 3:
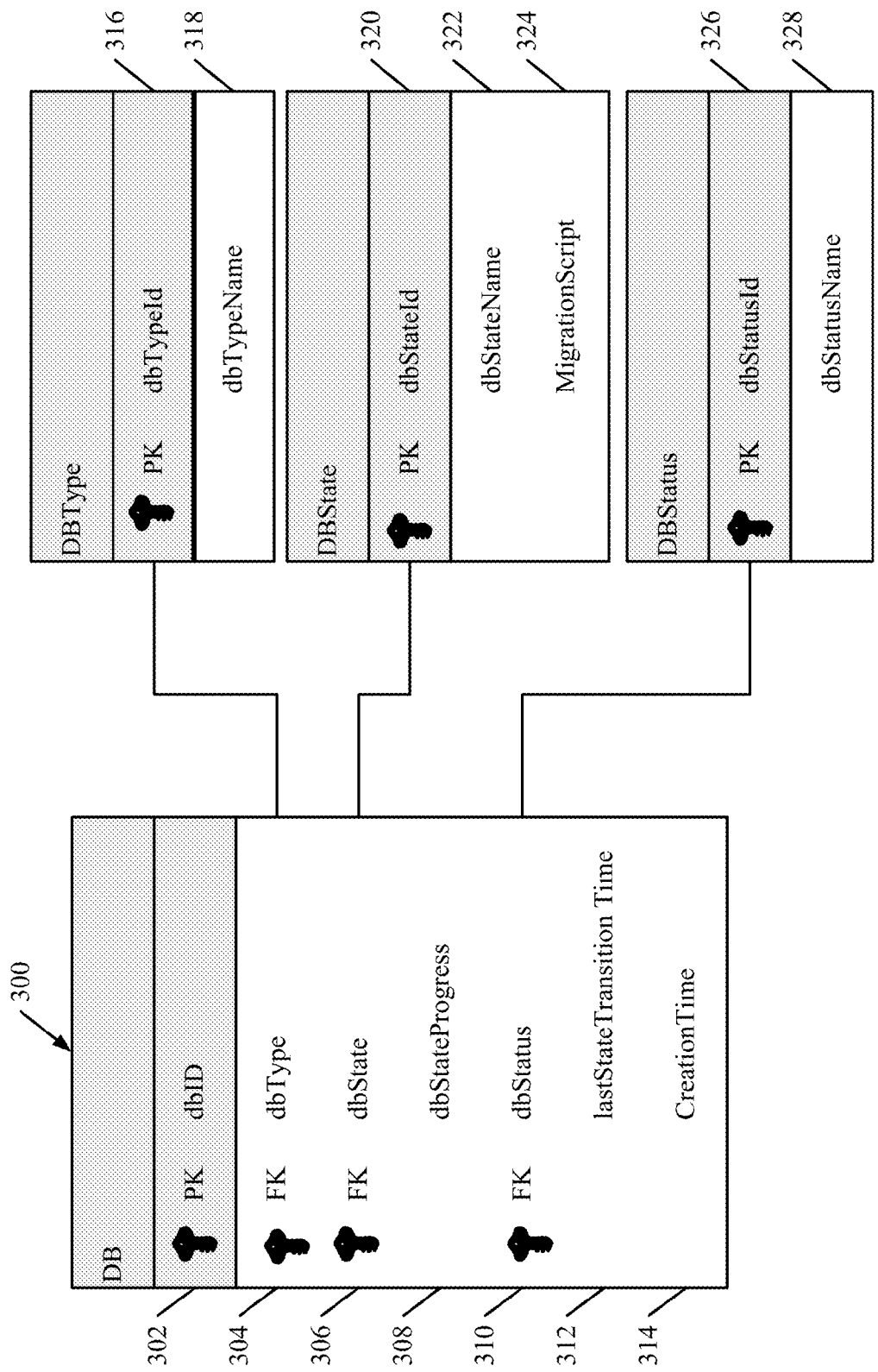
FIG. 3 illustrates one example of a structure of a migration status data store shown in FIG. 1.

FIG. 3 shows one illustrative embodiment of a database structure for a database status identifier 142-144 in migration status data store 140. It can be seen that, for each database that is being migrated, a database record 300 can be generated. The database record can include a database identifier 302, a database type indicator 304, a database state identifier 306, a database state progress indicator 308, a database status indicator 310, a last transition time indicator 312 that identifies the last time this particular database transitioned from one state to another, and the creation time 314 that indicates the time when this database record 300 was created.

FIG. 3 also shows that, in one embodiment, the database type indicator can include a database type identifier 316 and a database type name 318. For instance, the database may be a content database, a service database, etc.

FIG. 3 also shows that, in one embodiment, the database state identifier can include a database state ID 320, a database state name 322, and a migration script identifier 324. In keeping with the example migration steps discussed above, some database states may include "copying backups", "restoring database", "attaching database", "performing site transformation" and "performing identity transformation".

Database status indicator 310 illustratively includes a database status identifier 326 and a database status name 328. Some example database status names can include "initiated", "in progress", "suspend/waiting", "succeeded", "failed", among others. These indicate the status of the particular database state indicated by database state indicator 306.

Figure 4:
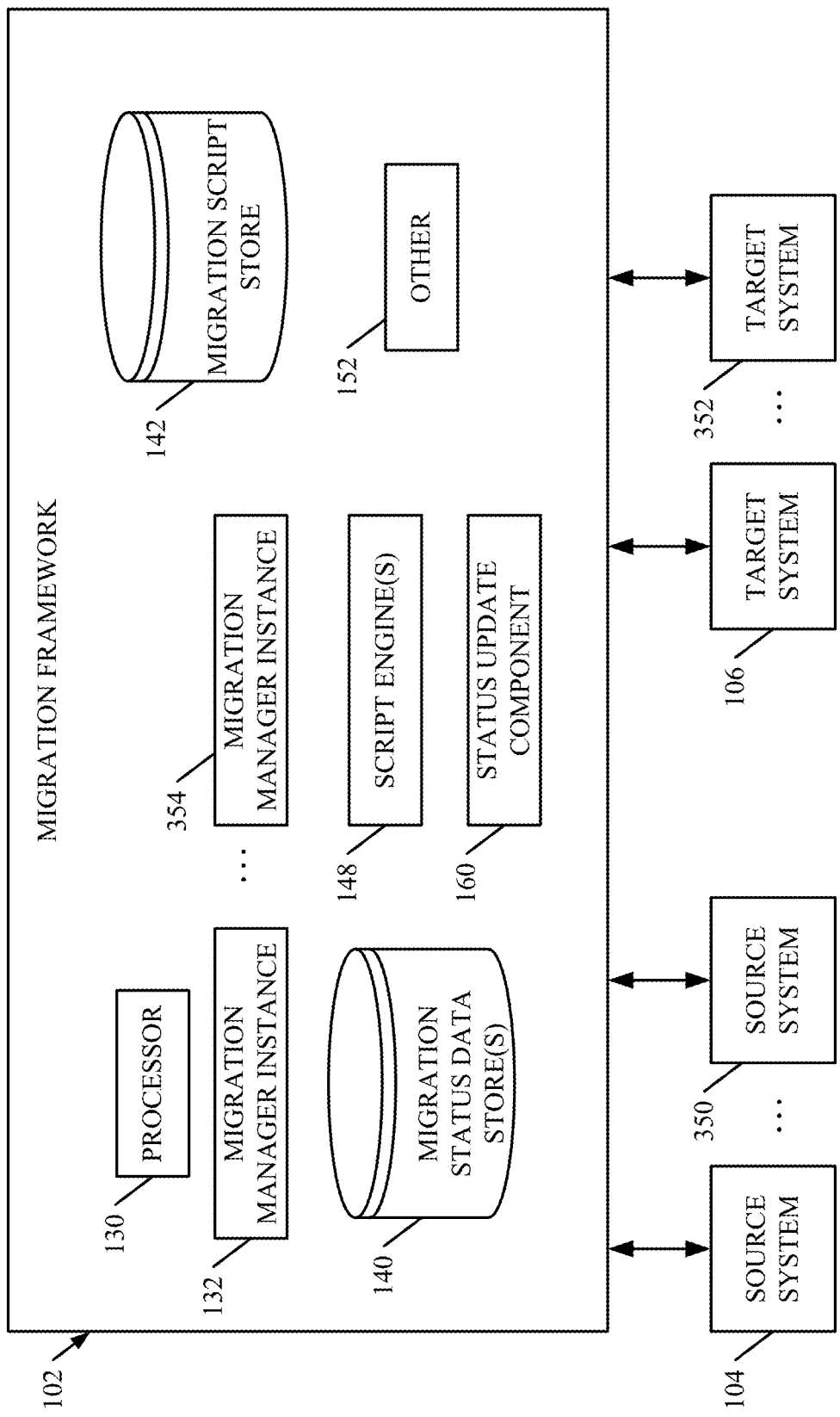
FIG. 4 is a block diagram of the migration framework migrating databases from a plurality of different source systems to a plurality of different target systems.

FIG. 4 illustrates the scalability of migration framework 102. In the embodiment shown in FIG. 4, some of the items are similar to those shown in FIG. 1, and they are similarly numbered. However, FIG. 4 also shows that, in the illustrated embodiment, migration framework 102 is simultaneously migrating a plurality of different source systems 104-350 to a plurality of different target systems 106-352. As discussed above, if the workload on migration manager instance 132 exceeds a threshold level, then migration framework 102 can launch another migration manager instance 354 and balance the workload between instances 132 and 354.

It will be noted that scalability may be provided not only with respect to migration manager instances 132-354, but with respect to other components of migration framework 102 as well. For instance, in one embodiment, each source system-target system pair that is the subject of a migration will have a corresponding migration status database. Therefore, additional migration status data stores 140 can be accessed, in order to accommodate the increased workload. Further, additional script engines 148 and status update components 150 can be launched in order to accommodate an increased workload as well.

It can thus be seen that the migration framework allows for migration routines or migration steps to be performed in parallel on multiple different databases, at the same time. The framework enhances the management of the migration process and provides scalability.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
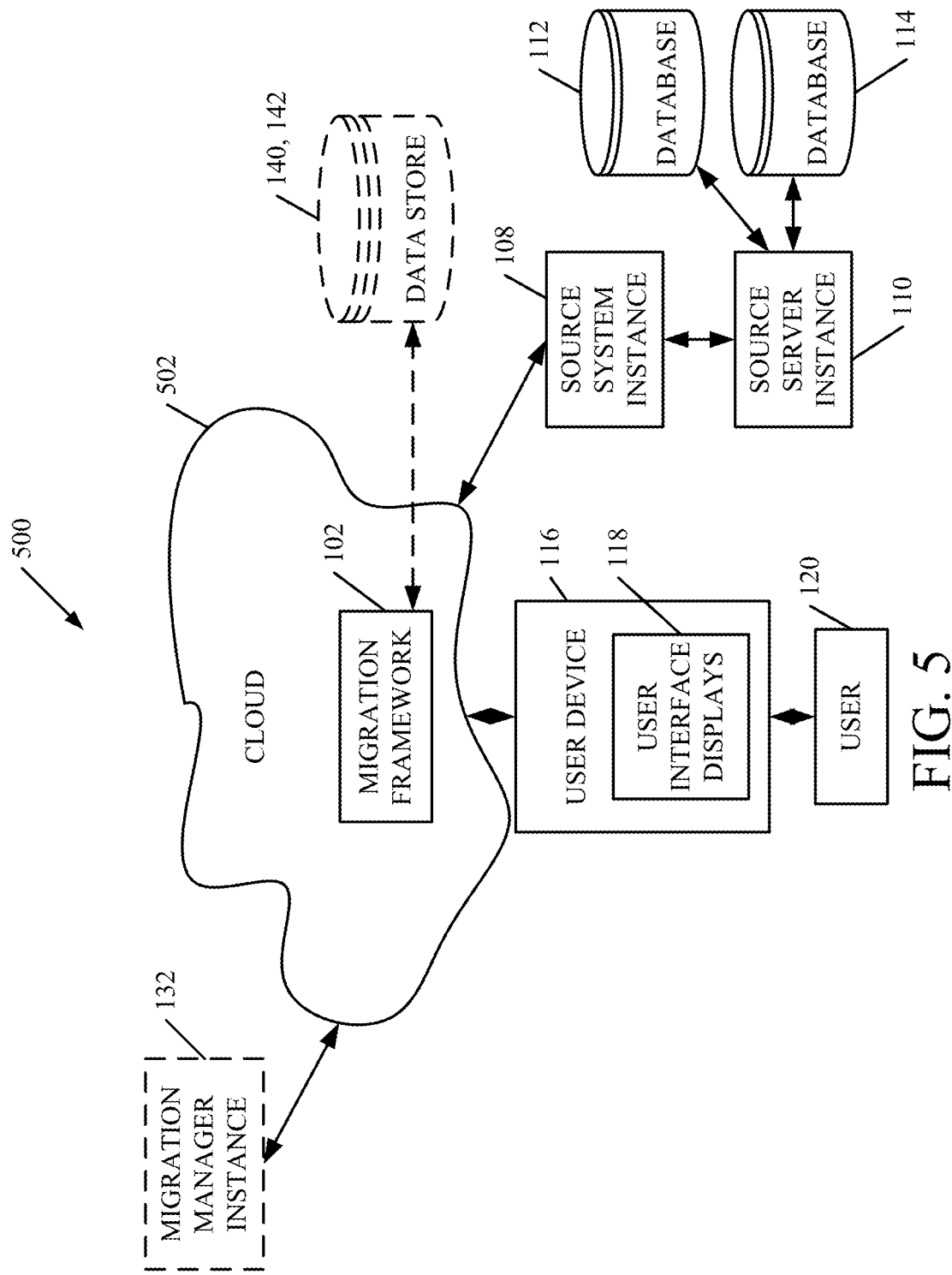
FIG. 5 is a block diagram showing the architecture of FIG. 1 deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that migration framework 102 is located in cloud 502 (which can be public, private, or a combination where portions are public while others are private). Therefore, user 120 uses a user device 116 to access those systems through cloud 502.

FIG. 5 also depicts another embodiment of a cloud architecture. FIG. 5 shows that it is also contemplated that some elements of migration framework 102 are disposed in cloud 502 while others are not. By way of example, data stores 140, 142 can be disposed outside of cloud 502, and accessed through cloud 502. In another embodiment, is also outside of cloud 502. Regardless of where they are located, they can be accessed directly by device 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
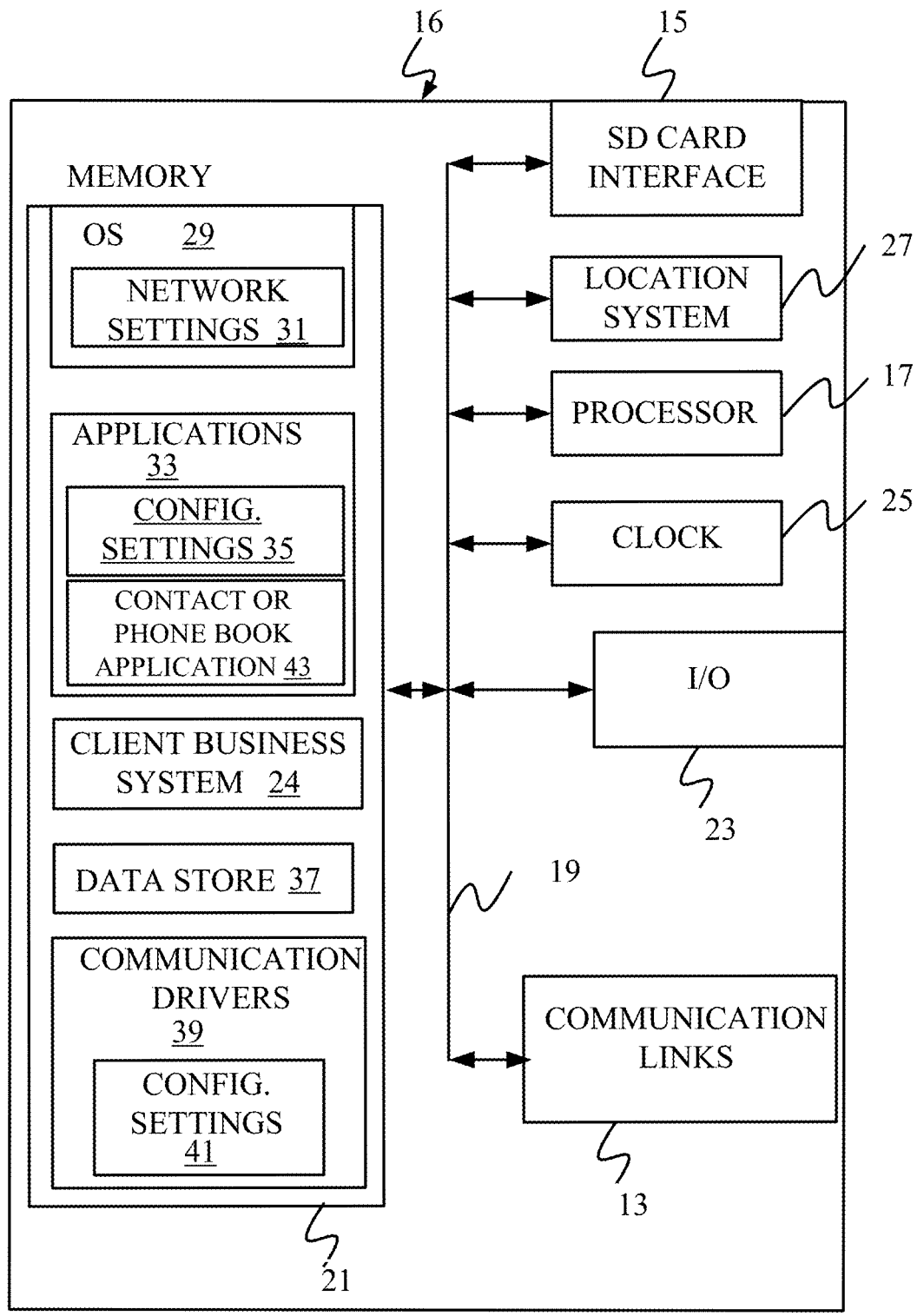
FIGS. 6-10 show various embodiments of mobile devices that can be used as a user device in commencing or monitoring a system migration.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 130 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
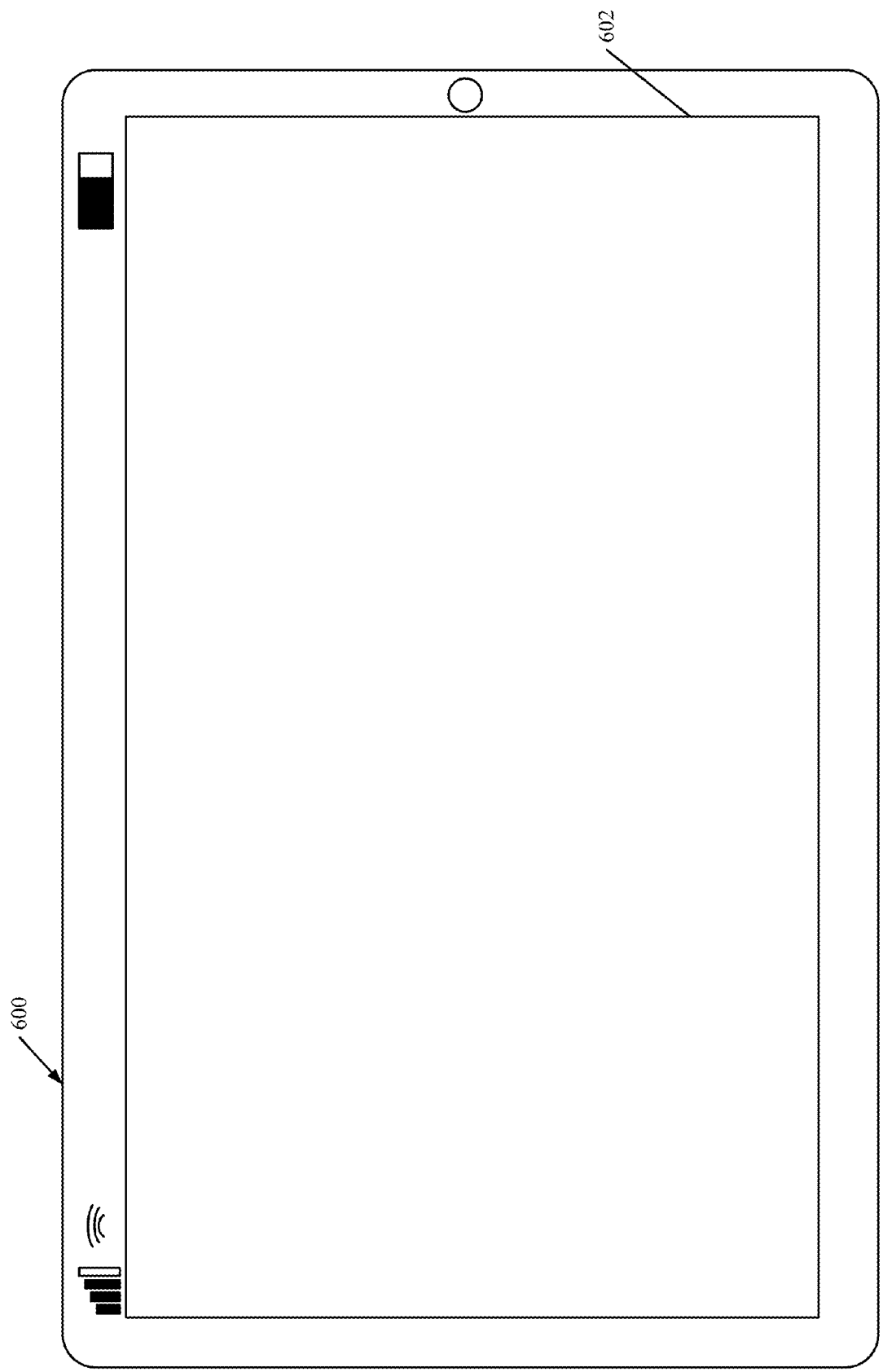

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
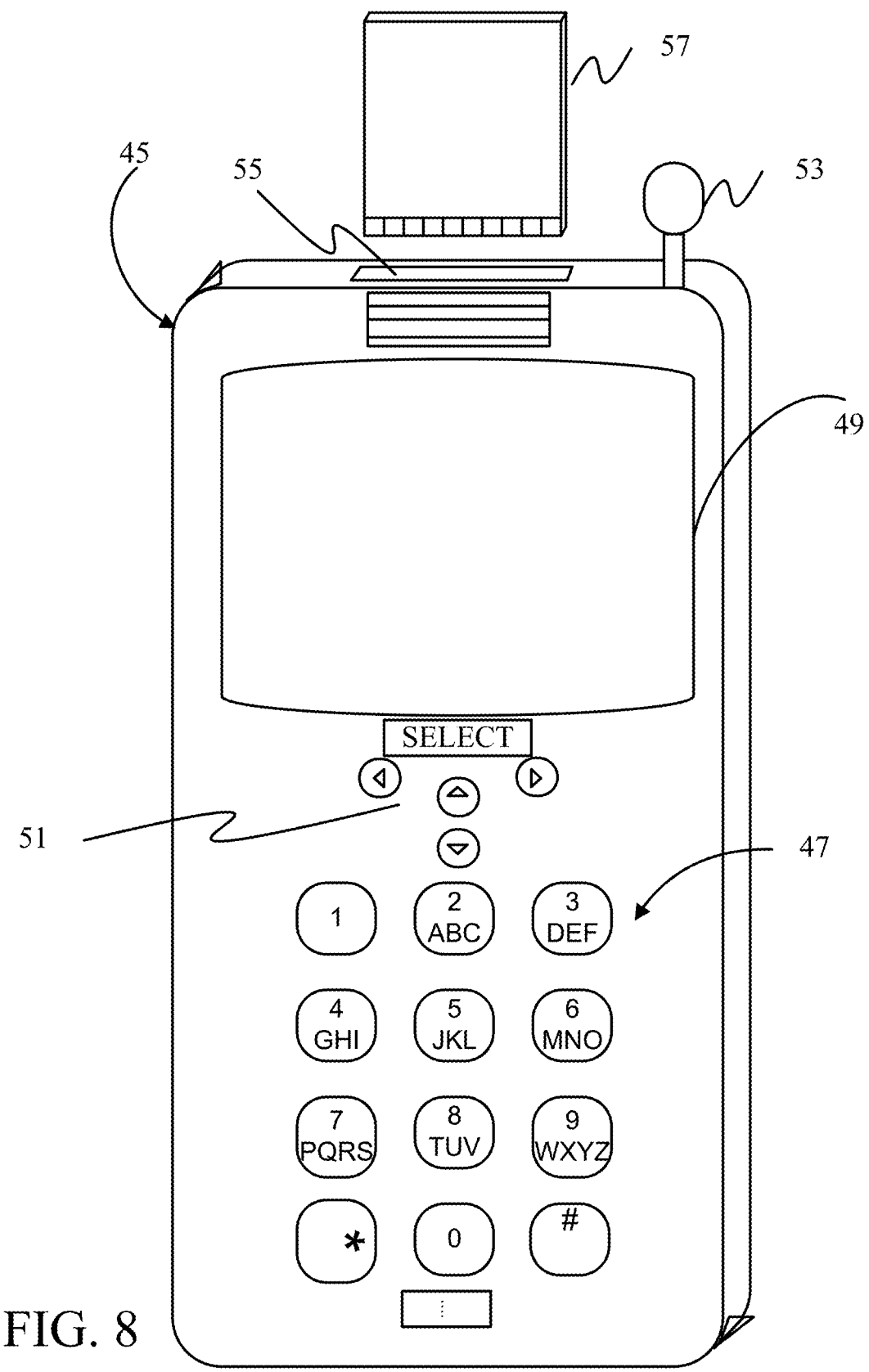
Figure 9:
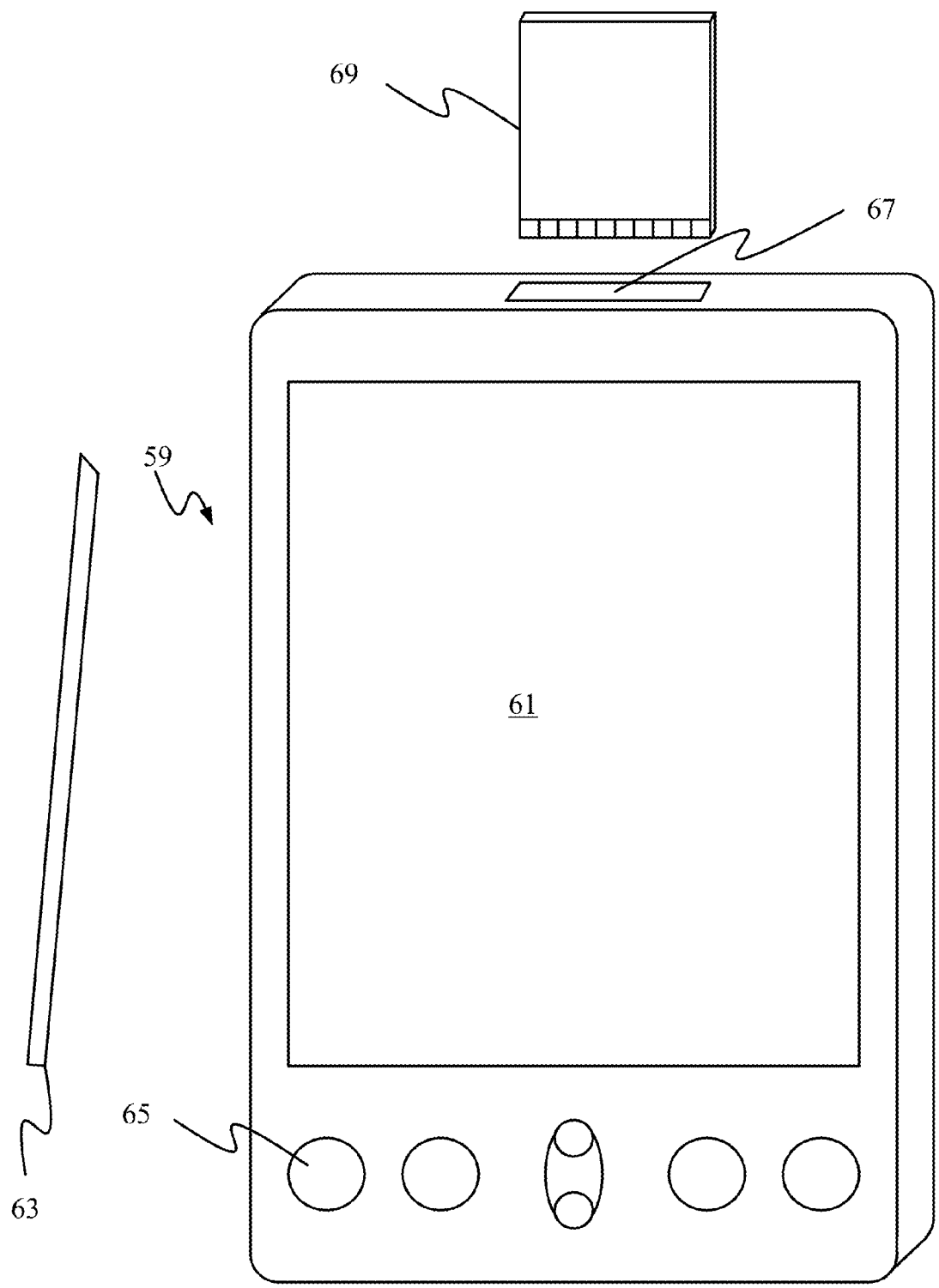

FIGS. 8 and 9 provide additional examples of devices 16 that can be used, although others can be used as well. In FIG.

8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
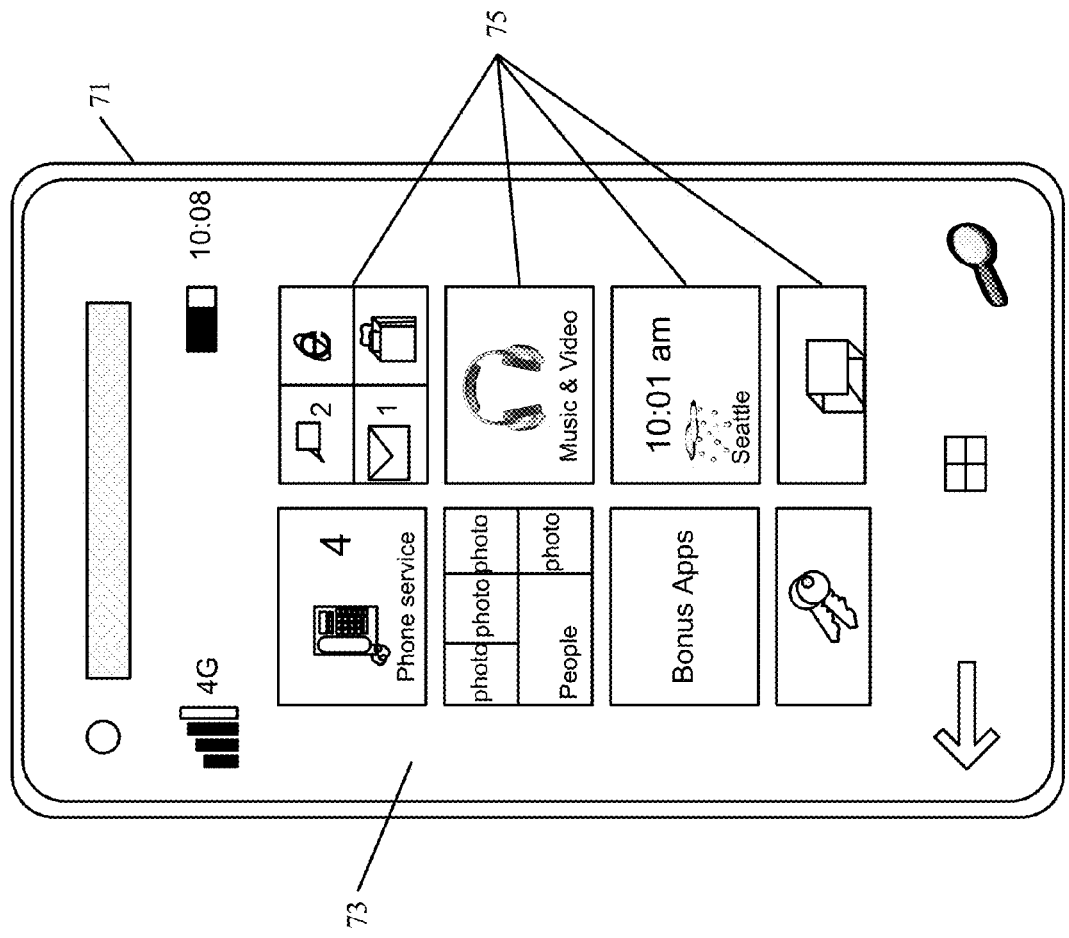

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
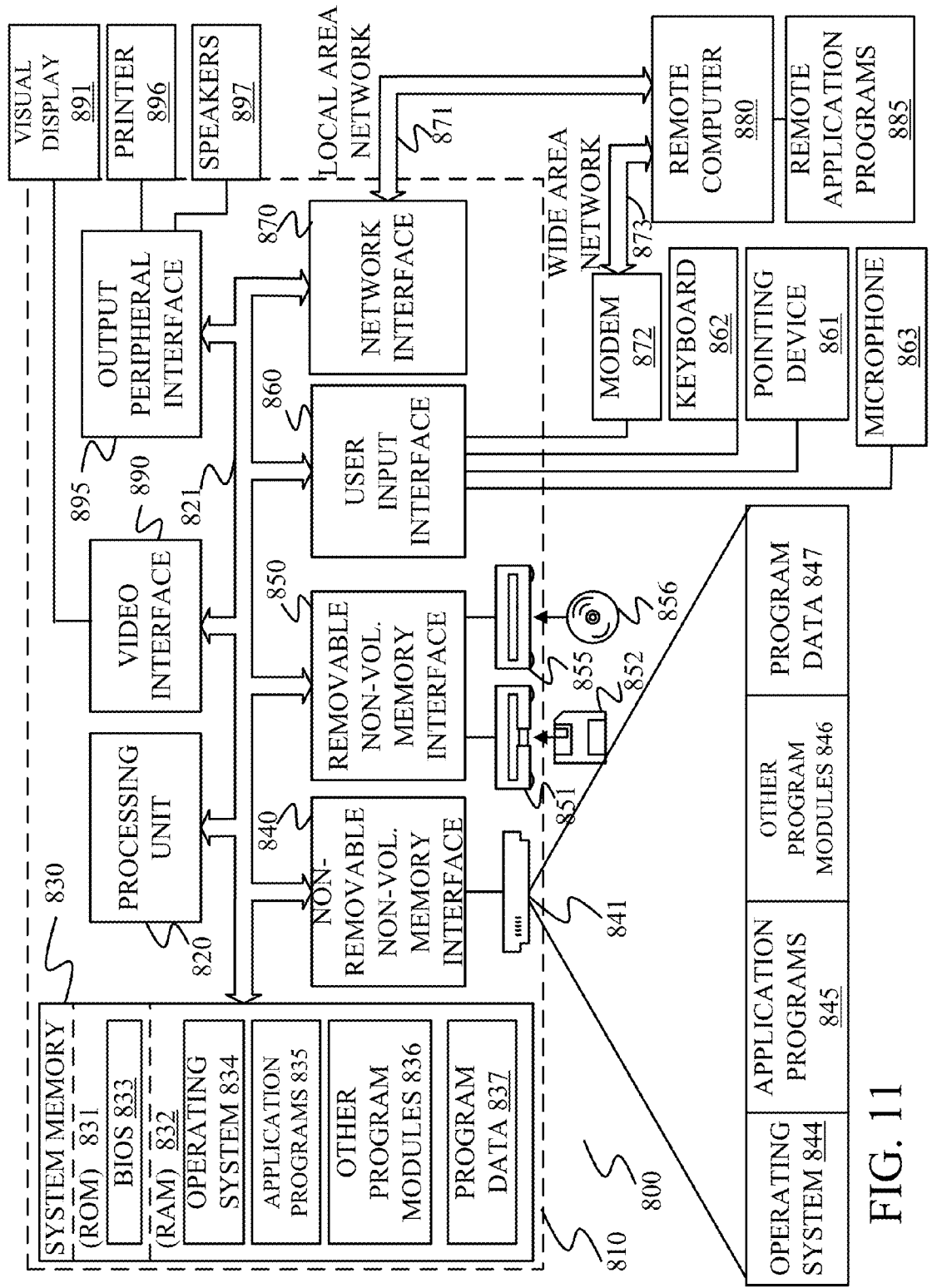
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 130), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for migrating a plurality of databases from a source deployment to a target deployment, the plurality of databases comprising at least a first database and a second database, the method comprising:
   accessing a database status data store to identify;
      a first migration status that corresponds to the first database and indicates one or more migration steps that have been performed on the first database in migrating the first database from the source deployment to the target deployment; and
      a second migration status that corresponds to the second database and indicates one or more migration steps that have been performed on the second database in migrating the second database from the source deployment to the target deployment; and
   identifying a first migration step to be performed for the first database, based on the first migration status corresponding to the first database;
   performing the first migration step and updating the first migration status based on the performance of the first migration step;
   identifying a second migration step to be performed for the second database, based on the second migration status corresponding to the second database; and
   performing the second migration step and updating the second migration status based on the performance of the second migration step.

2. The computer-implemented method of claim 1 and further comprising:
   prior to accessing the database status data store, opening a database status record in the database status data store for each database of the plurality of databases to be migrated, the database status record storing an indication of the migration status corresponding to the database.

3. The computer-implemented method of claim 1 and further comprising:
   prior to accessing the database status data store, receiving an indication of a set of migration steps to be performed to migrate the plurality of databases from the source deployment to the target deployment.

4. The computer-implemented method of claim 3 wherein identifying a migration step comprises:
   identifying one of the plurality of databases that has a migration status indicating that a current migration step, of the set of migration steps, is completed with respect to the identified database; and
   determining a next migration step, of the set of migration steps, that is to be performed on the identified database.

5. The computer-implemented method of claim 4 and further comprising:
   performing the next migration step on the identified database; and
   updating the migration status of the identified database in the database status data store to indicate that the next migration step is being performed on the identified database.

6. The computer-implemented method of claim 3, wherein the first migration status indicates that a current migration step is running on the first database, and wherein the first migration step comprises a next migration step, and wherein identifying the next migration step to be performed for the first database comprises:
  determining whether the current migration step has timed out with respect to the identified database; and
  if the current migration step has timed out with respect to the first database, rescheduling the current migration step to be performed on the first database as the next migration step to be performed on the first database.

7. The computer-implemented method of claim 3 wherein the first migration status indicates that a current migration step was completed on the first database with an error, and wherein the first migration step comprises a next migration step, and wherein identifying the next migration step to be performed for the first database comprises:
  rescheduling the current migration step to be performed on the first database as the next migration step to be performed on the first database.

8. The computer-implemented method of claim 5 wherein performing the next migration step comprises:
  accessing a migration script data store to identify a migration script to run to perform the next migration step; and
  running the migration script on the identified database.

9. The computer-implemented method of claim 3, wherein the first and second migration steps comprise different steps in the set of migration steps and are performed in parallel.

10. A migration system, comprising:
  a processor; and
  memory storing instructions executable by the processor, wherein the instructions, when executed, provide:
    a migration manager configured to:
      check a status data store to identify a plurality of migration statuses corresponding to a plurality of different databases that are to be migrated from a source deployment to a target deployment, wherein each migration status corresponds to one of the databases and indicates one or more migration steps that have been performed on the corresponding database in migrating the corresponding database from the source deployment to the target deployment; and
      for each respective database of the plurality of databases, select a migration step to be performed on the respective database based on migration status corresponding to the respective database;
    a migration engine configured to perform the selected migration steps on the plurality of different databases; and
    a status update component configured to update the migration status corresponding to each of the plurality of databases, based on the migration engine performing the migration steps on the plurality of databases.

11. The migration system of claim 10 wherein the migration manager comprises:
  a manager component configured to receive a set of migration steps to be performed on the plurality of different databases.

12. The migration system of claim 11 wherein the manager component is configured to identify a migration script corresponding to each migration step in the set of migration steps, the migration script being run by the migration engine to perform the corresponding migration step.

13. The migration system of claim 12 wherein the migration manager comprises:
  a scheduler component configured to schedule the identified migration scripts to be run by the migration engine on the plurality of different databases, in parallel.

14. The migration system of claim 10 wherein the instructions, when executed, configure the migration system to launch multiple instances of the migration manager, based on a migration workload.

15. A computing system comprising:
  at least one processor; and
  memory storing instructions executable by the at least one processor, wherein the instructions configure the computing system to:
    obtain a first migration status that corresponds to a first database in a source deployment and indicates one or more migration steps that have been performed on the first database in migrating the first database from the source deployment to a target deployment;
    obtain a second migration status that corresponds to a second database in the source deployment and indicates one or more migration steps that have been performed on the second database in migrating the second database from the source deployment to the target deployment;
    identify a first migration step to be performed on the first database, based on the first migration status corresponding to the first database;
    perform the first migration step on the first database and update the first migration status corresponding to the first database based on the performance of the first migration step on the first database;
    identify a second migration step to be performed on the second database, based on the second migration status corresponding to the second database;
    perform the second migration step on the second database and update the second migration status corresponding to the second database based on the performance of the second migration step on the second database.

16. The computing system of claim 15, wherein the instructions configure the computing system to:
  prior to obtaining the migration status, receive a set of migration steps to be performed to migrate the first and second databases from the source deployment to the target deployment; and
  for each of the first and second databases to be migrated, open a database status record in the status data store, each database status record storing an indication of the migration status for the corresponding database.

17. The computing system of claim 16 wherein the first migration status indicates that a current migration step is completed with respect to the first database, and wherein the first migration step comprises a next migration step in the set of migration steps, and wherein the instructions configure the computing system to:
  update the first migration status of the first database in the status data store to indicate that the next migration step is being performed on the first database.

18. The computing system of claim 16 wherein the first migration status indicates that a current migration step is running with respect to the first database, and wherein the first migration step comprises a next migration step, and wherein the instructions configure the computing system to:
  determine whether the current migration step has timed out with respect to the first database; and
  if the current migration step has timed out with respect to the first database, reschedule the current migration step to be performed on the first database as the next migration step to be performed on the first database.

19. The computing system of claim 16 wherein the first migration status indicates that a current migration step was completed on the first database with an error, and wherein the first migration step comprises a next migration step, and wherein the instructions configure the computing system to:
reschedule the current migration step to be performed on the first database as the next migration step to be performed on the first database.

20. The computing system of claim 17 wherein the instructions configure the computing system to:
access a migration script data store to identify a migration script to run to perform the next migration step; and
run the migration script on the first database.

* * * * *